(No Model.)
A. J. BARRETT.
VEHICLE SPRING.
No. 413,126.  Patented Oct. 15, 1889.
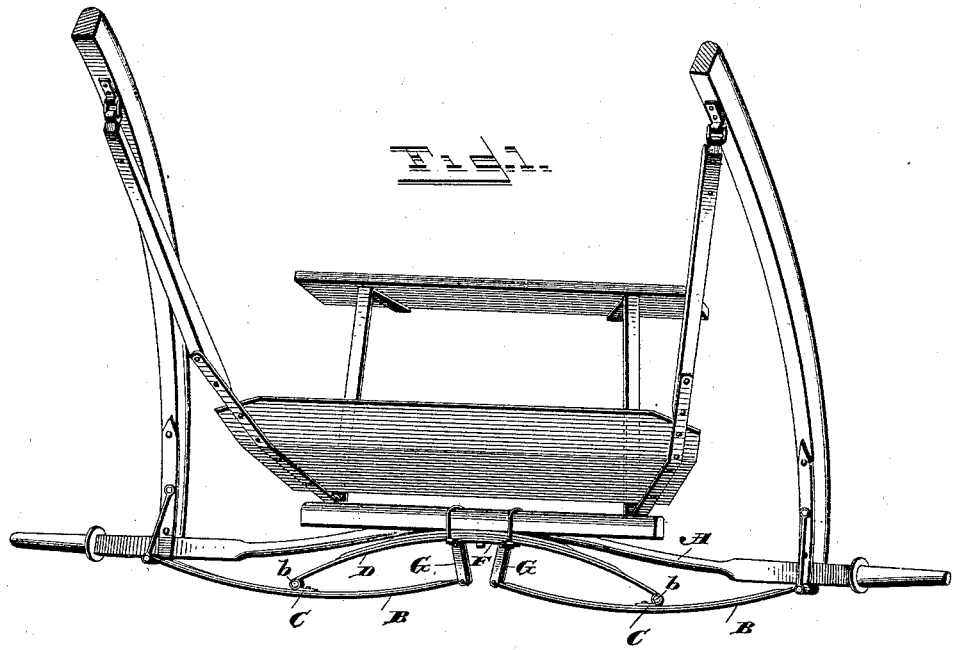
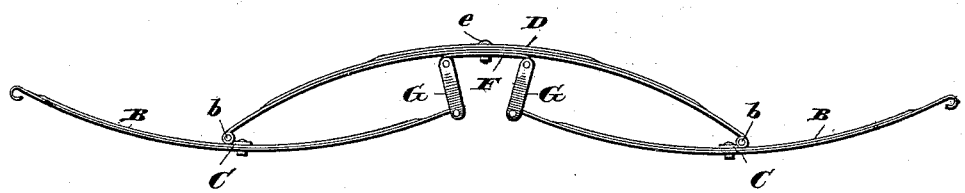
Ambrose J. Barrett.
INVENTOR
WITNESSES
G. S. Elliott.
E. W. Johnson
by
Attorney

UNITED STATES PATENT OFFICE.

AMBROSE J. BARRETT, OF PRAIRIEVILLE, MICHIGAN.

VEHICLE-SPRING.

SPECIFICATION forming part of Letters Patent No. 413,126, dated October 15, 1889.

Application filed January 3, 1889. Serial No. 295,270. (No model.)

*To all whom it may concern:*

Be it known that I, AMBROSE J. BARRETT, a citizen of the United States of America, residing at Prairieville, in the county of Barry and State of Michigan, have invented certain new and useful Improvements in Vehicle-Springs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in springs for vehicles.

The object of my invention is to provide a spring made up of three parts coupled to each other, so that the body of the vehicle, which is attached to the spring, can have both a vertical and lateral or oscillating movement thereon, as will be hereinafter fully set forth.

In the accompanying drawings, Figure 1 is a perspective view of a road-cart or sulky, showing my improved spring applied thereto. Fig. 2 is a side view of the spring.

In the accompanying drawings, A refers to the axle, to which the thills are rigidly coupled in any suitable manner, and in front of the thills suitable forwardly-projecting clips are provided, to which the upper ends of the springs B are secured by means of suitable bolts passing through eyes formed in the ends of said springs. These springs B B are composed of one or more leaves, the inner ends of the lower leaves being formed into eyes. At a point midway between the ends of the springs B are secured clips C, with inward projections for attachment to the springs. The bolts which attach the clip to the spring also serve to hold the leaves constituting the spring together. The clips C have upwardly-projecting side pieces, through which a suitable bolt $b$ passes for securing the ends of a semi-elliptical spring D thereto. This semi-elliptical spring D is preferably composed of several leaves, which are clipped in the ordinary manner to the sill or cross-bar of the vehicle-body, and to the central portion of the semi-elliptical spring is attached by a suitable bolt $e$ a clip F, through which pass bolts for attaching swinging links G, the lower ends of these links being connected to the inner ends of the upwardly-curved springs B B.

By the construction hereinbefore described I provide a spring which, when depressed by weight upon the body, will move vertically, and should the weight be to one side of the body the equilibrium of the spring will not be destroyed, as the loops will separate and permit the body to rise and fall vertically. The loops will also take up any side movement of the vehicle.

The spring hereinbefore described may be applied to side-bar wagons or other styles of vehicles. It will be observed that the upper spring is curved downwardly, while the two lower springs are curved upwardly, and when connected as shown and described the weight or pressure upon the upper spring causes it to lengthen out, and the weight, coming upon the upwardly-curved lower spring, causes said springs to contact or the ends come nearer together. The resistance of the two lower springs should be equal to the resistance of the upper spring, so that while the ends of the lower springs are stationary or rigidly secured to the axle, so as to not move laterally, the inner ends of the upwardly-curved springs will move to equal the expansion or spread of the upper spring. Thus the oppositely-curved springs act in conjunction with each other.

Having thus described my invention, what I claim as new, and desire to secure by Letters Patent, is—

1. A vehicle-spring consisting of two inverted semi-elliptical end sections B, a semi-elliptical central section D, the ends of which are connected to the concaved faces of the end sections at or near the center, and links G, pivoted at their lower ends to the inner ends of the end sections and at their upper ends to the concaved face of the central section at or near its center, substantially as described.

2. The combination of the downcurved semi-elliptic spring D, of a given strength, pivoted links G, secured adjacent to the center of said spring, upcurved semi-elliptic springs B, of about half the strength of spring D, connected at their inner ends to the lower ends of said links, and provided at center with clips to secure the ends of the down-curved spring D, substantially as described.

In testimony whereof I affix my signature in presence of two witnesses.

AMBROSE J. BARRETT.

Witnesses:
  JOHN CRUMP,
  ELON CLEMENT.